March 30, 1954 A. L. BARRETT ET AL 2,673,638
MATERIAL-RECEIVING, STORING, AND DISCHARGING APPARATUS
Filed April 8, 1950 8 Sheets-Sheet 1

Inventors:
A. Lee Barrett.
James S. Beeney.
by Louis A. Maxson
Attorney.

March 30, 1954 — A. L. BARRETT ET AL — 2,673,638
MATERIAL-RECEIVING, STORING, AND DISCHARGING APPARATUS
Filed April 8, 1950 — 8 Sheets-Sheet 2

Inventors:
A. Lee Barrett.
James S. Beeney.
by
Attorney.

March 30, 1954  A. L. BARRETT ET AL  2,673,638
MATERIAL-RECEIVING, STORING, AND DISCHARGING APPARATUS
Filed April 8, 1950  8 Sheets-Sheet 6

Inventors:
A. Lee Barrett.
James S. Beeney.
by Louis A. Maxson
Attorney.

March 30, 1954  A. L. BARRETT ET AL  2,673,638
MATERIAL-RECEIVING, STORING, AND DISCHARGING APPARATUS
Filed April 8, 1950  8 Sheets-Sheet 8

Inventors:
A. Lee Barrett.
James S. Beeney by Louis A. Maxson.
Attorney.

Patented Mar. 30, 1954

2,673,638

UNITED STATES PATENT OFFICE 2,673,638

MATERIAL-RECEIVING, STORING, AND DISCHARGING APPARATUS

Arthur Lee Barrett and James S. Beeney, Franklin, Pa., assignors to Joy Manufacturing Company, Pittsburgh, Pa., a corporation of Pennsylvania Application April 8, 1950, Serial No. 154,758

13 Claims. (Cl. 198—56)

Our invention relates to material-receiving, storing and delivering apparatus, and particularly to apparatus of the kind mentioned which is adapted for use with mineral vein disintegrating and disintegrated material-delivering apparatus which is capable of discharging a disintegrated material relatively continuously. "Continuous miners" of a recently developed type attack and disintegrate a mineral vein and deliver at their discharges the disintegrated mineral, as for example, but without limitation thereto, coal, in such a way that, though there are brief interruptions in the delivery of the mineral, due to the shifting of the position of the disintegrating mechanism laterally as successive upright bands are attacked and detached from the face, and longer interruptions, though still brief ones, between the completion of the disintegration of one complete transverse series of upright bands and the initiation of the attack on the next series, there is so nearly a continuous delivery of a relatively large quantity of mineral, that a serious problem is presented, because load reception by the transport devices which are best adapted to handle the product of such miners cannot be continuous.

The problem may be appreciated by reviewing some figures. If a miner had an average discharge rate of only a ton a minute, it will be apparent, since a shuttle car—the best present mode of handling the discharge of material from miners—requires on the order of three minutes to make a complete round trip between the point of reception of disintegrated material and the point of discharge to a mine conveying system, that some provision for the storage of three tons of coal must be made in order that the miner can continue its attack on a mineral vein while the shuttle car is traveling from the miner to its discharge point, effecting discharge of its load and returning to the miner.

The provision of an improved storage device adapted to meet such conditions is one of the objects of our invention. Such a device must have provision for the discharge of its received load. It must have storage capacity for the material discharged by the miner in the period of absence of the shuttle car. The storage and discharge functions may be accomplished by various means, as by the provision of a hopper with associated means for distributing the material in the hopper during its reception, and for discharging it from the hopper at an accelerated rate when a shuttle car is to be loaded. One characteristic of commonly utilized distributing and discharging devices is that so long as they continue to move while material is being delivered to them, that material will be spread over their material-receiving surfaces, this layer being thick or thin depending on the rate of operation, and if even a thin layer of material be left on the material-distributing and discharging apparatus at the end of a discharge period to a shuttle car or the like, and the material-distributing and discharging apparatus continues to operate during the reception and distribution in the storage device of a load while a shuttle car is not in a position to receive the discharge from the storage device, such layer of material will be discharged without having a receptacle available for it, and thus result in a clean-up problem.

It is an object of our invention to provide an improved material-receiving, storing and delivering apparatus. It is a more specific object of our invention to provide an improved material-distributing and discharging apparatus which may be operated as a whole during the normal reception and distribution and during the discharge of material, but which may have a portion thereof rendered inoperative while another portion thereof continues to operate, under the control of, and at the will of an operator. A more specific object is to provide an improved material-receiving, storing and discharging apparatus, so constructed and arranged that the distribution of a thin layer of material throughout the bottom thereof, during the final stages of unloading therefrom of an accumulated load, may be prevented. Still another object of the invention is to provide an improved material-receiving, storing and discharging apparatus having not only means for distributing material received thereby, during loading thereof, throughout its length at an appropriate rate, and for unloading the material rapidly when it is desired to discharge it, but also means for preventing material which may continue to be delivered to one end of the apparatus during the final stages of unloading of the load from such apparatus from being advanced by that end of the apparatus to other portions thereof. A further object is to provide an improved material-receiving, storing and discharging apparatus having improved material-handling apparatus incorporated therein whereby material may be moved from one portion thereof to discharge while material being delivered to another portion thereof may be stored where it falls, such improved material-handling apparatus including a plurality of material-moving devices having common actuating means and some adapted to have their actuating means rendered inoperative for a desired period. Other objects and advantages of the invention will hereinafter more fully appear.

In the accompanying drawings, in which one illustrative embodiment and a modification which our invention may assume in practice, are shown for purposes of illustration.

Figure 1:
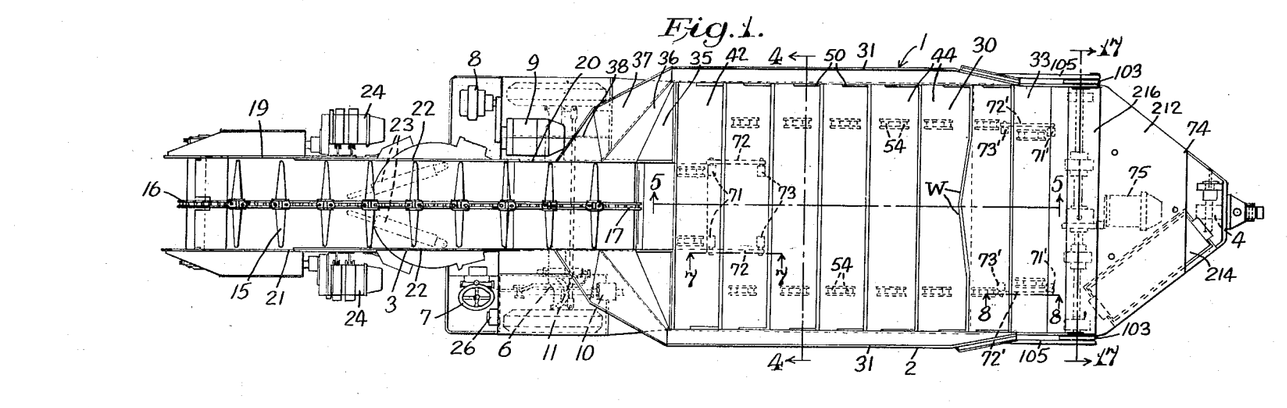
Fig. 1 is a plan view of a material-receiving, storing and discharging apparatus constructed in accordance with the illustrative embodiment of the invention.
Figure 2:
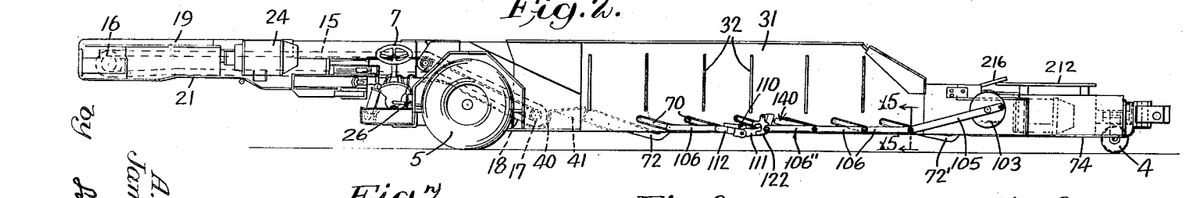
Fig. 2 is a side elevational view of the structure shown in Fig. 1.
Figure 3:
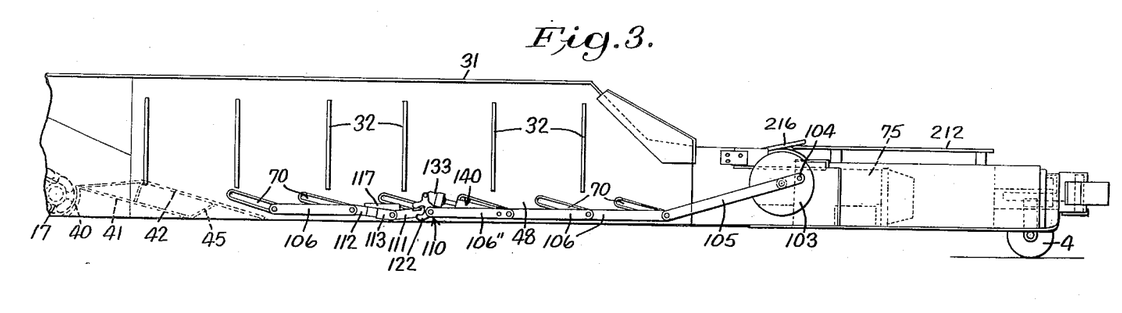
Fig. 3 is a fragmentary side elevational view of a portion of the apparatus shown in Figs. 1 and 2, the parts being on a larger scale.

Referring to the drawings, and first particularly to Figs. 1 and 2, it will be noted that the material-receiving, storing and delivering apparatus 1 comprises a hopper section 2 and a delivery section 3, and that the whole unit is supported on a front supporting wheel 4, and by a pair of steerable wheels 5, herein shown as rubber tired. The steering devices for the wheels 5 are of a conventional type employed in shuttle cars, and this steering mechanism, shown in dotted lines at 6, is controllable by a hand wheel 7 in a well-known manner, the steering mechanism being hydraulically operable by hydraulic fluid delivered by a pump 8 driven by a motor 9 and including a so-called Bendix valve 10 and a steering cylinder 11. This structure need not be further described in view of the fact that it is essentially conventional.

The structure of the delivery section 3 is also essentially conventional, and this includes a flight conveyor 15 extending around a drive sprocket 16 at the delivery end of the apparatus 3 and about an idler sprocket 17 at the end of the conveyor nearer the supporting wheel 4. The conveyor includes a sloping portion 18 and a generally horizontal portion 19, and the conveyor frame structure includes a rigid forward portion 20, a laterally swingable, rearward delivery end portion 21, and an intermediate portion laterally bounded by flexible side boards 22, and the delivery portion is laterally swingable by hydraulic cylinder and piston mechanism 23. The conveyor 15 is driven by motors 24 supported on the swingable portion 21. A further description of this portion of the apparatus is unnecessary since it corresponds closely in general construction with the arrangement shown in the John D. Russell application, Serial No. 783,759, filed November 3, 1947. It will be evident that any suitable control means for the motors 24 may be provided. Such control means includes a suitably located electrical control mechanism 29 by means of which the motor 24 may be started and stopped. The full speed of the discharge conveyor 15 is sufficient to handle the full rate of material delivery from the hopper section 2.

Figure 4:
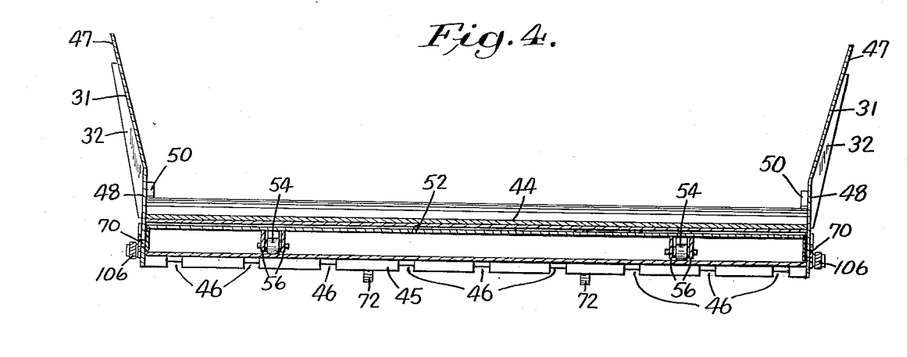
Fig. 4 is an enlarged transverse vertical section substantially on the plane of the line 4—4 of Fig. 1.
Figure 5:
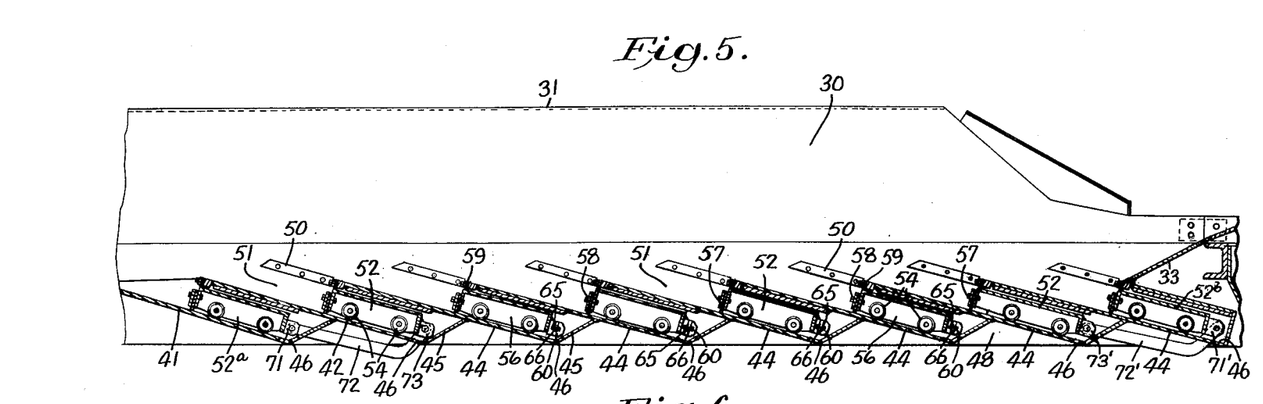
Fig. 5 is a fragmentary longitudinal sectional view on the plane of the section line 5—5 of Fig. 1, the parts being shown on an enlarged scale.
Figure 6:
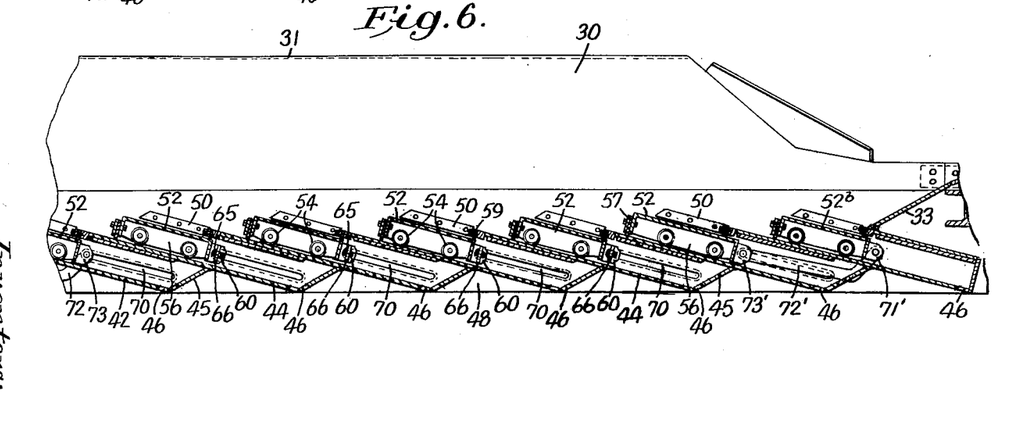
Fig. 6 is a view similar to Fig. 5 showing parts in different relative positions.
Figure 7:
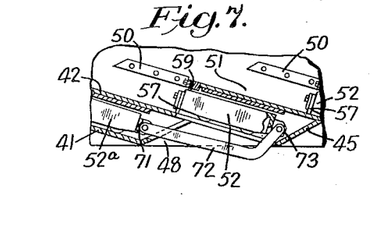
Fig. 7 is an enlarged fragmentary longitudinal sectional view on the line 7—7 of Fig. 1 with parts shown in elevation.
Figure 8:
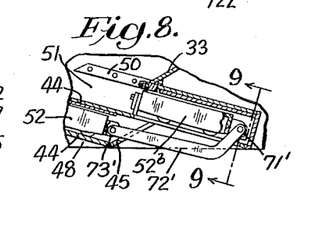
Fig. 8 is an enlarged fragmentary longitudinal view on the line 8—8 of Fig. 1 with parts shown in elevation.
Figure 9:
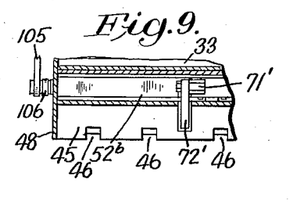
Fig. 9 is a fragmentary transverse sectional view on the line 9—9 of Fig. 8.

The hopper section 2 comprises walls forming a storage space 30: side walls 31 reinforced with vertical plates 32 welded or riveted to them, a front wall 33 sloping, at least at its upper portions, downwardly towards the discharge end of the hopper, and a series of inclined plates 35, 36, 37 and 38. The plate 35 slopes slightly downwardly toward the sloping portion 18 and the plates 36, 37 and 38 slope towards the storage space 30 and also towards the sloping portion 18 of the discharge conveyor so that material which is forced against the plates 36, 37 and 38 will have a tendency to slide longitudinally of the apparatus to the right in Fig. 1, but also at both sides towards the longitudinal center line of the apparatus. At the bottom of the section 2 there is provided a curved wall 40 partially surrounding the front end of the orbit of the conveyor 15, and a sloping flat transverse bottom plate 41 extends toward the center of the storage space 30 from the wall 40. Next comes a sloping bottom plate 42 of substantially the full width of the section 2 and parallel to the plate 41, and the bottom proper of the section 2 includes a number of plate sections 44, each parallel to the plate sections 41 and 42, the several plate sections being interconnected with each other by oblique reinforcing and closure elements 45, the latter, or both the latter and the plate sections 41, 42 and 44, being appropriately perforated as indicated at 46 for the escape of material which may need to be gotten out of the way. At this point it may be noted (see Fig. 4)

that the side walls 31 diverge from each other at their upper portions 47, and that there are parallel, vertical, lower wall portions 48 to which the plates 41, 42, 44 and 45 are severally secured as by welding. Each of the plates 44 has, constituting a guideway in alignment with it, and secured as by riveting to the side plate sections 48, guide strips, one at each side of the section 2 and designated 50. It will be observed that between the plates 41 and 42 and the adjacent plate 44, and between each pair of mutually overlapping plates 44, there are thus provided guideways 51 in which box-like pusher members 52 are reciprocable. These box-like pusher members or elements are open at their bottoms and are supported by rollers 54 shown in pairs near either end of each pusher member, these rollers being supported by depending bracket members 56. The rollers 54 roll upon the plates 41, 42 and 44. The box-like pusher elements 52 have at their ends which are adapted to be engaged by material within the chamber 30 suitable plow or scraper elements 57. These may be of rubber, or fabric and rubber, or any other suitable material, and are held to the material-engaging ends of the box-like elements by suitable screw and nut devices, or the like, 58. Suitable scrapers 59 of like material are carried at the upper ends of the plates 42 and 44 to engage the tops of the pusher members 52 and prevent material from passing along such tops. The most rearward one of the pusher members 52 herein designated 52a is only as wide as the flight conveyor 15 while all the others of the pusher members 52 are as wide as the bottom portion of the storage chamber 30. It will be noted that the pusher member 52 which is the second one from the right as viewed in Fig. 1 has its central portion of its end which is adapted to be engaged by the material within the chamber 30 wedge shaped as at W to direct the material toward the sides of the storage chamber 30.

Means is provided for moving all of the box-like pusher elements 52 concurrently in one direction, and then concurrently in the opposite direction, and also for effecting such movement of some of said elements while interrupting entirely the movement of the others. This mechanism is illustrated in Figs. 4 to 22.

It will be noted that each box-like member 52, except the front and rear ones, which are respectively designated 52b and 52a for purposes of distinction has its lower side and adjacent each of its opposite ends a shaft-receiving box structure 60. These boxes are bored as at 61 to receive shafts and are broached or otherwise suitably formed with diametrically opposite slots 62 extending lengthwise thereof in full communication with the bores 61. Stub shaft elements 65, each having a cross key member 66, are adapted to be inserted in the box members 60, by passing the key member 66 through the slots 62, and when the key member 66 has been passed entirely through the box members 60, it may be brought to a position at right angles to that which it occupied during insertion and then moved slightly outwardly so that the free ends of the key 66 will engage in recesses 67 formed in the innermost extremities of the box members 60. When the structure, later described, which is associated with the stub shafts 65, has been assembled thereon and secured against escape, as by cotter pin 69, there will be insufficient endwise play of the stub shaft 65 to permit the release of the keys 66 from the slots 67. Each of the stub shafts extends through an oblique guide slot 70 formed in the side plate portions 48 and arranged substantially half way between the upper and lower surfaces of the guides 51. Formed on the front end of the pusher member 52a are bosses 71 which have pivotally connected thereto arms 72 which are pivotally connected at their opposite ends to bosses 73 which are formed on the front end of the next adjacent pusher member 52 so that longitudinal movement of the pusher member 52a is provided by its adjacent pusher member. The most forward one of the pusher members which is designated 52b has formed on its forward end bosses 71' which have pivotally connected to them arms 72' which are pivotally connected at their opposite or rearward ends to bosses 73' formed on the forward end of the next adjacent pusher member 52 so that longitudinal movement of the pusher member 52b is provided by its adjacent pusher member.

The body portion 2, in the embodiment of the invention first disclosed, includes a support or platform section 74 on which a motor 75, of any suitable type, is mounted as by the support members 75'. This motor has a drive shaft 76 carrying a drive pinion 77 which engages and drives a drive gear 78. The latter is mounted on a short shaft 79 which also carries a drive pinion 80, and the shaft 79 is mounted in bearings 81, 82 carried by a gear casing 83, also mounted on the support section 74. The pinion 80 meshes with and drives a spur gear 84 carried on a worm shaft 85 journaled in combined radial and thrust bearings 86, 87 and carrying a worm 88. The worm 88 meshes with and drives a worm wheel 89. The latter has a splined mounting 90 on a shaft 91, which is connectible by a chain clutch 92 with an aligned shaft section 93 supported in bearings 94. The other end, 95, of the shaft 91 is journaled in a bearing 96 supported in a part of the gear housing 83, and is connected as by a chain clutch 97 with an aligned shaft 98 whose other end is journaled as at 99 in a bearing 100. The bearings 94 and 100 are supported by the frame portion 74. Each of the shaft sections 93 and 98 extends through an opening 102 in an upright plate portion 48' and each carries a crank disc 103 suitably mounted thereon and supporting a crank pin 104. The crank pins are connected by links or pitman elements 105 with the forward ones of an aligned series of pivotally connected link elements 106. The link elements 106 are each connected at one end pivotally to one of the stub shafts 65. In order that a portion of the links may transmit motion to the stub shafts 65 while another group of stub shafts may remain still, there is arranged between two of the link members a link-equivalent structure 110 (see particularly Figs. 10 to 13), one at either side of the apparatus, including two short link sections 111 and 112. These are pivotally connected with each other by means of a fork 113 formed on the link element 112. Between the arms 114 of which fork a pivot pin 115 extends, and to this pivot pin link element 111 is connected. The link element 112 has rigidly secured to it as by welding, and as best shown in Figs. 10 to 14, a stop element 117 having a slightly sloped end portion 118, which is adapted to prevent the link elements 111 and 112 having their pivotal connection pass materially below a horizontal plane including the axes of the stub shafts 65 to which the ends of the elements 111 and 112 which are not pivotally connected to each other, are pivotally secured. It will be apparent that with the link elements 111 and 112 in the position shown in Figs. 10 and 11 thrust may be delivered by the link element 111 to the link element 112. If, however, the pivot pin 115 is raised above the horizontal plane including the axes of the stub shafts 65, 65 to which the link elements 111 and 112 respectively are secured, then no motion will be transmitted to those box-like pushers 52 which lie at the opposite side of the structure 110 from the drive apparatus, and instead, while the stub shafts 65 to the right of the structure 110 will continue to be reciprocated relative to their inclined guides and cause reciprocation of their box-like pusher elements 52, the box-like pusher elements to the left of the link elements 111 and 112 will remain stationary.

In order that the links 111, 112 may be positioned and maintained with the axes of their connecting pivot pins 115 below the planes in which the axes of the adjacent pivot pins 65 lie, and in order that the axes of the pivot pins 115 may be positively raised well above said planes at will, we have provided at the sides of the apparatus, and with parts appropriately changed in position at the opposite sides the following mechanism:

The link elements 111 are each provided with a laterally projecting shelf portion 121, these extending outwardly from the links and being arranged near the tops of the links 111. To cooperate with these shelf portions 121 special holding and actuating members 122 are provided. These are pivotally supported on the pin members 65 to which the forward ends of links 111 are attached, and lie in the same series of longitudinally extending planes as the shelf portions 121. Each of the devices 122 includes a lower arm 125 having an end 126 adapted to engage the lower side of the shelf portion 121 and to lift the latter positively in such a manner that the links 111 will have their ends which are connected to the pivots 115 lifted far enough to insure breaking of the rigid drive connection which exists when the parts are in the position shown in Fig. 11. Each of the devices 122 includes an upper, somewhat longer arm 127 having a nose portion 128 adapted to engage the upper sides of the shelf portions 121 and to cause these shelf portions and the links 111 which carry them to move from an upper position shown in Fig. 12 down to the lower positions shown in Figs. 10 and 11 and to maintain them in such lower positions. They may hold the links in the positions of Figs. 10 and 11, firmly, or simply prevent their inadvertent movement from such positions depending on the position to which the devices 122 are moved. The arms 127 have upstanding projections 130 between their ends and these are pivotally connected to opposite, unequally thick arm portions 131 and 132 formed on chamber-providing members 133 having chambers 134 in them, and having heads 135 secured to them. The pivotal connection between the arms 131 and 132 and the upward projection 130 is in the form of a pivot pin 136. The head 135 has a central opening 138 through which a portion of the piston rod 139 of a cylinder and piston mechanism 140 extends. The piston rod has a collar 141 adapted to engage the outside of the head 135 and inside of the chamber 134 it is provided with a nut 143 which engages a spring 144 which extends between the nut and the inner wall of the head 135. With this arrangement it will be appreciated that through the compressibility of the spring there is provided some yield in the connection between the piston rod 139 and the head member 135 when the piston rod tends to pull the head member and associated parts to the right in Fig. 10. The piston rod 139 carries a piston 146, shown in dotted lines in Fig. 10 and movable within a cylinder 147 which is pivotally connected by a pivot pin 148 extending between that one, 106', of the links 106 with which the link element 111 is pivotally connected and an extra, parallel link 106" which is associated with the link 106'.

Figures 10, 11:
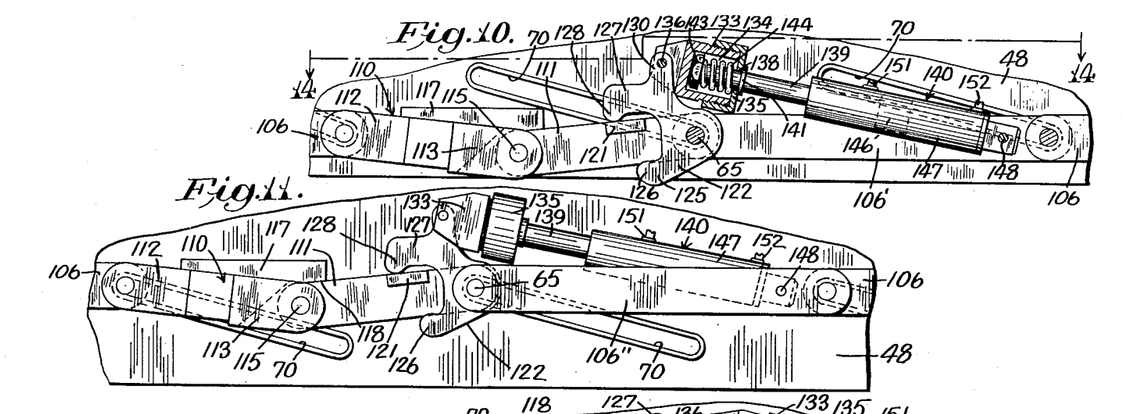
Figs. 10, 11, 12 and 13 are all fragmentary side elevational views on a much enlarged scale, showing details of drive means and means for the partial interruption of the operation of the devices driven thereby, parts being broken away in Fig. 10 to show details of construction.
Figures 12, 13:
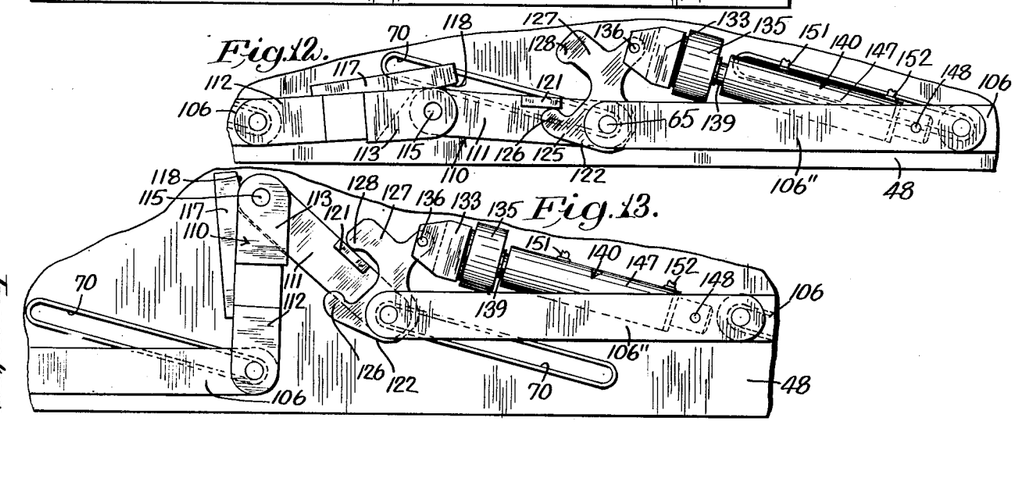
Figures 14, 15, 16, 17:
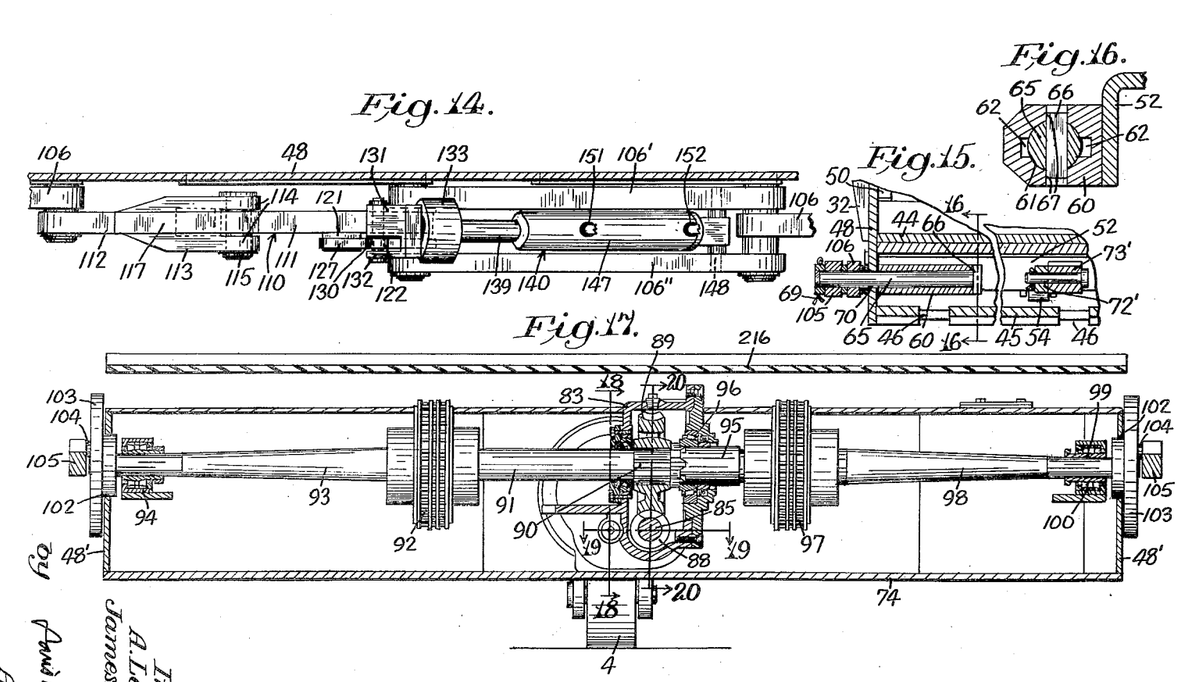
Fig. 14 is a horizontal sectional view taken on the plane of the line 14—14 of Fig. 10.
Fig. 15 is an enlarged fragmentary vertical transverse section on the plane of the line 15—15 of Fig. 2.
Fig. 16 is an enlarged detail sectional view on the plane of the section line 16—16 of Fig. 15 with parts omitted.
Fig. 17 is a transverse vertical section on a much enlarged scale, the view being taken on the plane of the line 17—17 of Fig. 1.
Figure 18:
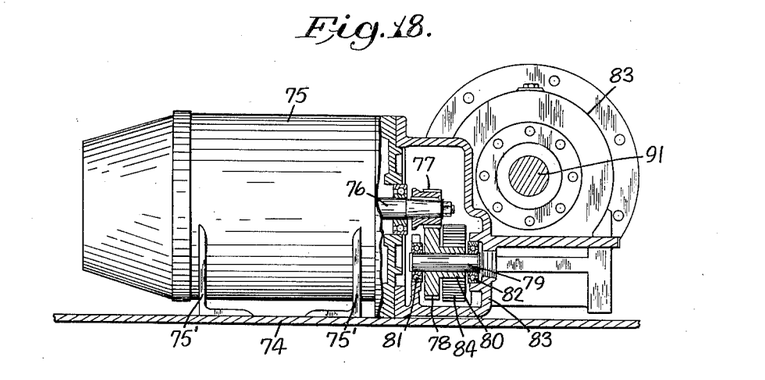
Fig. 18 is an enlarged longitudinal sectional view with parts shown in elevation on the plane of the section line 18—18 of Fig. 17.
Figure 19:
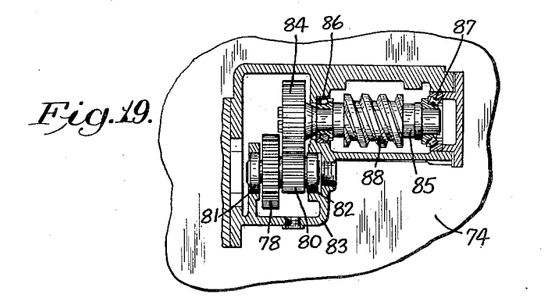
Fig. 19 is an enlarged detail horizontal sectional view on the plane of the line 19—19 of Fig. 17.
Figure 20:
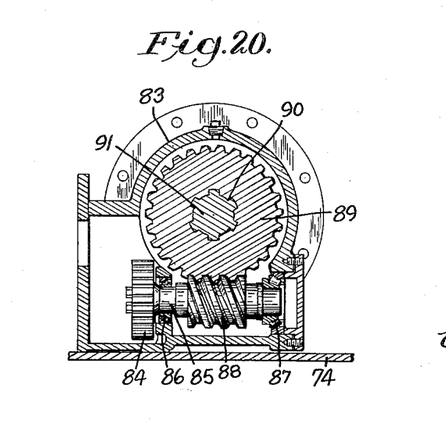
Fig. 20 is an enlarged, detail, vertical sectional view on the plane of the line 20—20 of Fig. 17.

Fluid supply and discharge connections 151 and 152 lead to the opposite ends of the cylinder 147 from any suitable source of supply of fluid under pressure, and by supplying fluid through the connection 151 and venting the connection 152 the member 122 shown in Figs. 10 to 13 may be moved from the relative positions shown in Figs. 10 and 11 to the relative positions shown in Figs. 12 and 13. In Fig. 12 the member 122 has been moved in such a manner that the coaction between the nose portion 128 and the shelf portion 121 is interrupted, and the links 111 and 112 can assume the relative positions shown in Fig. 13 upon the thrusting to the left of the links 106' and 106". When pressure is supplied through the connection 152 and the connection 151 is vented the piston rod 139 will be forced to the left relative to the cylinder 147 and the link 111 will be held in the position shown in Figs. 10 and 11. When the pivot pin 115 has been raised as in Fig. 12 the reciprocation of the various links 106, 106' and 106" to the right of the links 111 and 112 can take place without transmitting any motion to the link 106 to the left of the links 111 and 112. When, however, the member 122 is in the position shown in Figs. 10 and 11 all of the links 106, 106' and 106" will be reciprocated together and all, instead of a part of the pusher members 52 will be reciprocated. It will be clear that the connection 151 need not be with the very end of the cylinder 147 since the piston 146 can move no further to the left in the cylinder, due to the abutment of the nose portion 128 with the shelf portion 121, than the position of Fig. 10.

The mode of operation of the construction described will be easily understood. The motor 75 may be stopped or started as desired; it may be operated continuously or "goosed"; it is adapted to effect, when operating at normal speed and continuously, reciprocation of the box-like pusher elements 52, 52a and 52b at such a rate as to feed all of the material stored in the chamber 30 to the flight conveyor 15 during the period of perhaps 45 seconds to one minute required to load a shuttle car. As has been made clear, the five pusher elements toward the right in Fig. 5 may be operated continuously while the three at the left may be operated with the others or allowed to remain stationary.

The cycle of operation may now be traced. Let it be assumed that the hopper space 30 is filled with material and that a shuttle car has been brought beneath the projecting end of the delivery conveyor 15. This conveyor can then be operated by the motors 24 and, with the pusher members 52, 52a and 52b operated at their full continuous drive rate material will be discharged from the chamber 30 onto the delivery conveyor and delivered by the latter into a shuttle car in materially less than one minute. When the space 30 has had the material in it delivered to the delivery conveyor and discharged by the latter, except for such portion as may remain between the ends of the delivery conveyor, the condition of the bottom of the hopper will be that there is a relatively shallow layer of material spread throughout the same and, if the shuttle car goes off and operations continue unchanged, this material will be discharged onto the mine bottom. This undesirable result will be avoided by supplying fluid to the cylinder and piston mechanisms 149 in such a manner that the drive of the left hand trio of pusher elements will be interrupted as previously described. This will have two effects; no more material will be delivered to the discharge conveyor, and accordingly this may deliver all the material on it to the shuttle car before the latter starts on its delivery trip. Moreover, the material being delivered into the field of action of the right hand group of pusher elements will be advanced by the latter and stored at the left hand end of the space 30. Thus there will be no discharge to the mine floor of any material while the shuttle car is away from the miner and the apparatus 1 and the control for the motor 75 may be so operated that material will be stored in the material-receiving space 30 so that the load may be properly loaded when the shuttle car returns empty for a new load. From the foregoing description it will be appreciated that we have provided an improved arrangement in which through the rendering inactive of a series of material-moving elements, while leaving others of the same series still active, material may be received and stored in a very desirable manner and without any danger of loss of any part of the material to the mine bottom.

In the embodiment of the invention which has been described the material pusher elements have been disclosed as actuated by a special motor, i. e. one individual to them, mounted on the apparatus 1. They may, of course, be driven in other ways, and by power provided from an external motor, as for example one on the miner. Miners have hydraulic pumps driven by motors which form a part of the miner structure and hydraulic fluid from the miner served by the apparatus 1 can be used to effect operation of the pusher elements. It is also possible to provide a fluid reservoir and a suitably driven pump on the platform section 74 of the apparatus 1. An appropriate hydraulic motor drive for the pitmen 105, as a substitute for the electric motor driven mechanical drive hereinabove described, will now be disclosed.

Figures 21, 23:
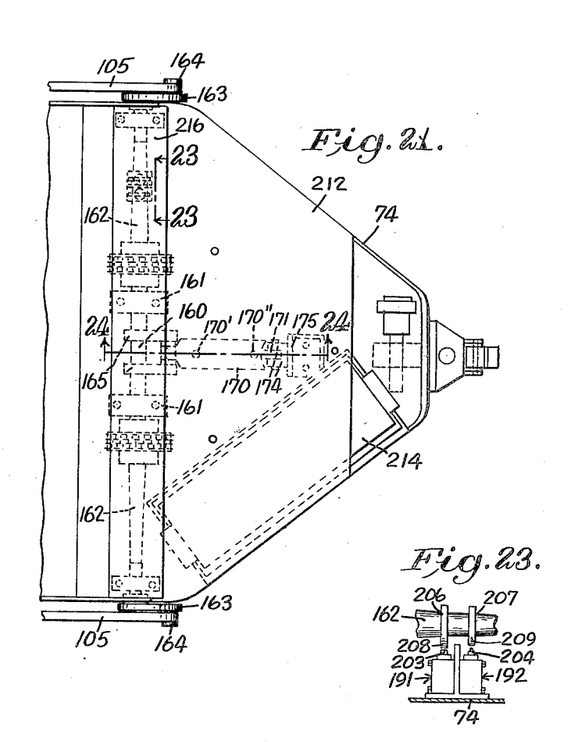
Fig. 21 is a fragmentary plan view of a modified material-receiving, storing and discharging apparatus, showing a different actuating means for the material-moving devices.
Fig. 23 is an enlarged transverse sectional view taken on the plane of the line 23—23 of Fig. 21.
Figure 22:
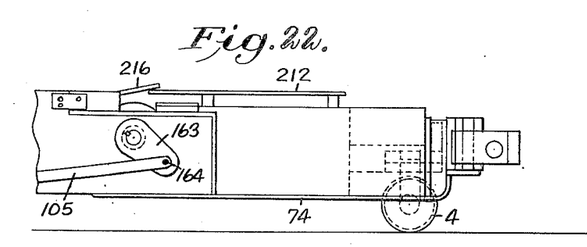
Fig. 22 is a side elevation of the structure shown in plan in Fig. 21.
Figure 24:
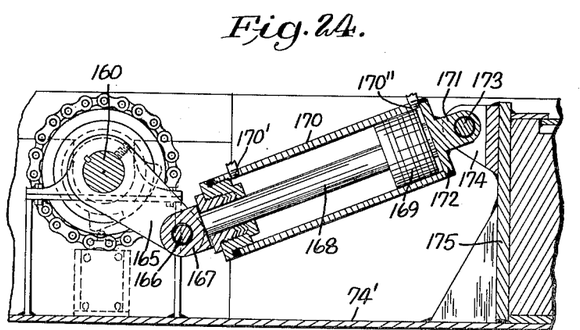
Fig. 24 is a vertical section, on an enlarged scale, taken on the line 24—24 of Fig. 21.

It will be evident that the pitman can be actuated by a rock shaft as well as by a crank pin-carrying rotating shaft. A suitable rock shaft is illustrated in Figs. 21 and 24, at 160. This rock shaft is mounted in suitable bearings 161 and is shown connected to extension rock shafts 162, 162 in the same way the shaft 91 is connected to the shafts 93 and 98. The shafts 162, 162 carry crank arms 163, 163 fixed to them, and the pitmen 105 are pivotally connected to the arms 163, 163 by pivot or crank pins 164, 164. Accordingly rocking of the shaft 160 will effect actuation of the pusher members 52, 52a and 52b.

To rock the shaft 160, the same is provided with parallel arms 165, 165, connected by a pin 166, to which a head 167 mounted on a piston rod 168 is pivotally connected. Piston rod 168 is connected with a piston 169, which is reciprocable in a cylinder 170, and the cylinder 170 is pivotally supported by an ear 171 secured to its rear head 172 and surrounding a pin 173 which is carried by ears 174 mounted on a pedestal 175 carried by the body portion 74'. The piston 169, cylinder 170 and piston rod 168 constitute an actuating jack to rock the rock shaft 160. The cylinder 170 has connections 170' and 170" for the supply of a hydraulic fluid to and the venting of hydraulic fluid from its opposite ends.

The supply of fluid to, and the venting of fluid from the connections 170' and 170" may be effected in any suitable manner, and one appropriate procedure will be described. A hydraulic fluid source is provided by a reservoir or tank 176. The fluid is drawn from the tank through a conduit 177 which leads to a pump 178, which may be located in any appropriate place, as, for example, on the miner or on the body portion 74, and which may be operated by any suitable motor means not shown. Pump 178 discharges to a pressure line 179, with which an accumulator 180 is connected through a conduit 181. The pressure supply line 179 leads to a valve mechanism 182, herein being shown as opening into the latter near the central portion thereof. Return conduits lead from the valve mechanism 182, through branch lines 183 and 184 arranged near the ends of the valve mechanism, to a return line 185 which leads back to the tank 176. It will be noted that the communications of the conduits from the connections 170' and 170" with the valve device 182 are between, in each case, the point of connection of the pressure line 179 and the point of connection of the vent or exhaust lines 183 and 184. The valve mechanism 182 may be of any suitable fluid actuated valve type, and throwing fluid for the valve (not shown) of this mechanism will be supplied to one end of the valve mechanism and vented from the other, and vice versa, through throwing conduits 187 and 188. The supply of fluid to the conduits 187 and 188 in alternation, and the venting of fluid from these conduits when they are not serving for the supply of throwing fluid is controlled by pilot valve devices 191 and 192. These have supply connections 193 and 194 to which fluid is conducted through a conduit 195, which branches off of the pressure line 179. Vent connections for the pilot valves 191 and 192 are provided at 199 and 200 and these are connected with a conduit 201 which leads back to the exhaust line 185, and through a portion of the latter to the tank 176. The pilot valve devices 191 and 192 are herein shown cam actuated and of a well known type, and each has an actuating plunger, the plunger for the pilot valve 191 being shown at 203 and that for the pilot valve 192 at 204. One of the shafts 162 as shown in Fig. 23 has fixed thereto a pair of cam members 206 and 207 respectively having thereon cam portions 208 and 209. The cam portion 208 operates the plunger 203 of the pilot valve 191 and the cam portion 209 operates the plunger 204 of the pilot valve 192.

Figure 25:
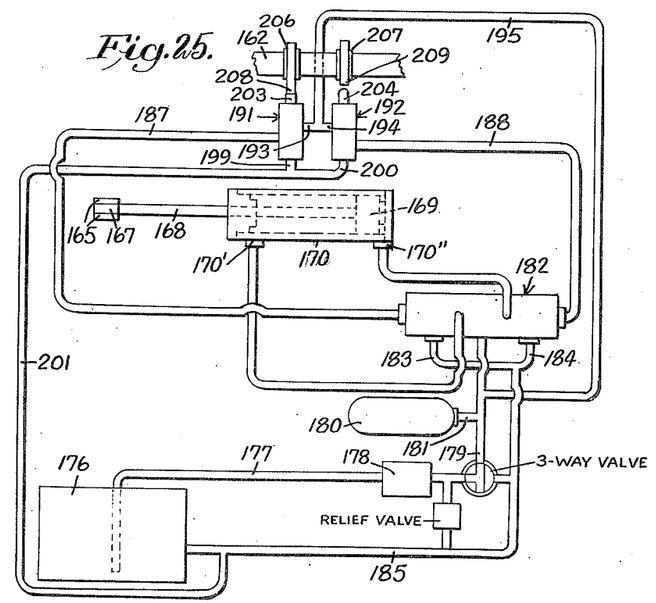
Fig. 25 is a diagrammatic view of a hydraulic operating system which is employed in the modification.

The cam 208 is shown in Fig. 25 as engaging the plunger 203 and the valve of the valve device 182 is in right hand position and fluid is being supplied to connection 170" and vented from connection 170'.

When the jack piston 169 reaches the other end of its cylinder the cam portion 209 will have engaged and moved the plunger 204 and caused the pilot valve 192 to admit fluid from the conduit 195 through the throwing passage 188 to the valve mechanism 182, and operate the latter to admit fluid through the conduit to the other end of the jack cylinder 170 and to vent fluid from the end of the jack cylinder 170 which had previously had fluid supplied to it. It will be understood that each of the pilot valves, where no longer held in a position to supply fluid to one end of the valve mechanism 182, will occupy a position venting its respective one of the lines 187 and 188, but the valve mechanism, in accordance with well known practice, may be provided with yieldable internal holding means so that it will not be displaced from either position from which it may be moved by hydraulic fluid until hydraulic pressure is supplied to effect its movement.

Those skilled in the art will readily understand the mode of operation of the hydraulic system shown in Fig. 25, with the aid of what has been explained in detail, and it will be appreciated that as the piston 169 is reciprocated in the cylinder 170 the rocker shaft 169 will be rocked in a manner to effect the reciprocation of the pusher members 52, 52a and 52b. A cover plate 212 protects the driving mechanism for the pitmen 105 and the connections of a controller 214, and a rubber pad 216 is so positioned as to receive the bottom rear end portion of the delivery end of a miner.

The general mode of operation of the pusher members is the same whether a mechanically driven crank shaft carrying a pair of crank pins is rotated, or whether a hydraulic jack is employed to effect the application of power to the pitmen 105. In either event it will be appreciated that the invention provides an improved material-receiving, storing and delivering structure in which a complete series of material-moving devices may all be utilized to effect discharge of a load, or distribution in a storage space of a load, while, at appropriate times, as above explained, some of the material-pushing devices may be maintained stationary while the others to which the material is initially delivered may continue to operate with the result that while the load is received in a wholly adequate manner there is no spreading of a layer of material over the bottom of the storage space in such a way that it would be dumped on the mine floor before a complete load could be accommodated by the apparatus.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What we claim as new and desire to secure by Letters Patent is:

1. In an apparatus of the character described, a hopper structure comprising walls forming a storage space for receiving and storing material and having a plurality of conveyor means associated therewith, one of said conveyor means including a plurality of serially arranged material pusher elements reciprocable in parallel inclined paths lying between the ends of and extending longitudinally of said storage space for moving material along said hopper structure to distribute a load therein and to discharge a load therefrom and another of said conveyor means disposed to receive material from said serially arranged pusher elements and to discharge it to an extraneous point, said plurality of serially arranged material pusher elements comprising two groups, one arranged to discharge to the other, and means for driving each of said conveyor means concurrently at a rate to effect the discharge of a load from said apparatus and for interrupting the drive of said other group of pusher elements while the drive of the group which discharges thereto and of said another conveyor means is maintained, said pusher elements having links connecting them in a series for movement together and said drive-interrupting means including means for effecting the collapse of certain of said links to interrupt the drive of pusher elements driven through said certain links.

2. In an apparatus of the character described, a body for receiving and storing material, and conveyor means associated with said body including a plurality of serially acting pusher elements moving obliquely to the direction in which said body extends for moving material along the body to distribute a load therein and to discharge a load therefrom, an actuating means for said pusher elements including links pivotally connecting successive pusher elements together, at least one pair of said links having a hinge between its ends, and means being provided to lock said hinge to cause the pusher elements at opposite ends of said hinged links to move together or permit said hinged links to swing at will without transmitting motion from one end thereof to pusher elements at the other end thereof, said pusher elements so arranged that those at said one end of said hinged links deliver material to those at the other end of said hinged links.

3. In an apparatus of the character described, a body for receiving and storing material, and conveyor means associated with said body including a plurality of serially acting pusher elements moving obliquely to the direction in which said body extends for moving material along the body to distribute a load therein and to discharge a load therefrom, and actuating means for said pusher elements including links connecting successive pusher elements together, at least one pair of said links having a hinge between their ends and permanent pivotal connections with the pusher elements at their opposite ends, and means being provided, including releasable devices carried by certain of said links for positively moving the hinge points of sad links which have a hinge between their ends to positions beyond planes including their pivotal connections to lock said hinge to cause the pusher elements at opposite ends of said links which have a hinge between their ends to move together or permit said links which have a hinge between their ends to flex at will without transmitting motion from one end thereof to pusher elements at the other end thereof.

4. In an apparatus of the character described, a body for receiving and storing material, and conveyor means associated with said body including a plurality of serially acting pusher elements moving obliquely to the direction in which said body extends for moving material along the body to distribute a load therein and to discharge a load therefrom, and actuating means for said pusher elements including links connecting successive pusher elements together, at least one pair of said links having a hinge between its ends, and means being provided, including hydraulic cylinder and piston mechanism supported by certain of said links to lock said hinge to cause the pusher elements at opposite ends of said hinged links to move together or permit said hinged links to flex at will without transmitting motion from one end thereof to pusher elements at the other end thereof.

5. In an apparatus of the character described, a body for receiving and storing material, and conveyor means associated with said body including a plurality of serially acting pusher elements moving obliquely to the direction in which said body extends for moving material along the body to distribute a load therein and to discharge a load therefrom, and actuating means for said pusher elements including links connecting successive pusher elements together, at least one pair of said links having a hinge between its ends, and mechanism supported by the pair of links adjacent said hinged links to lock said hinge to cause the pusher elements at opposite ends of said hinged links to move together or permit said hinged links to swing at will without transmitting motion from one end thereof to pusher elements at the other end thereof.

6. In an apparatus of the character described, a body for receiving and storing material, and conveyor means associated with said body including a plurality of serially acting pusher elements moving obliquely to the direction in which said body extends for moving material along the body to distribute a load therein and to discharge a load therefrom, and actuating means for said pusher elements including links connecting successive pusher elements together, at least one pair of said links having a hinge between its ends, and means including hydraulic cylinder and piston mechanism supported by links adjacent said hinged links to lock said hinge to cause the pusher elements at opposite ends of said hinged links to move together or permit said hinged links to swing at will without transmitting motion from one end thereof to pusher elements at the other end thereof.

7. In an apparatus of the character described, in combination, a body for receiving and storing material, conveyor means associated with said body and extending lengthwise of the same for substantially the full length of the bottom thereof, said conveyor means including individually link-connected pusher elements, a discharge conveyor means positioned to receive material from said first conveyor means and to discharge material received from the latter to a point of discharge, and driving means associated with said conveyor means to (1) effect simultaneous drive of both of the same to effect delivery of a stored load at a predetermined rate, (2) to effect continued operation of said delivery conveyor means to effect emptying thereof while a portion of said first conveyor means is stationary, and (3) to effect simultaneous operation of both conveyor means to effect the storing of a new load of material, the link connections between certain of said pusher elements being collapsible, and means for locking rigidly or permitting collapse of said collapsible links being provided whereby said driving means is operative to drive the whole or but a part of said first conveyor means at will.

8. In an apparatus of the character described, in combination, a body for receiving and storing material, conveyor means associated with said body and extending lengthwise of the same for substantially the full length of the bottom thereof, said conveyor means including individually link-connected pusher elements, a discharge conveyor means positioned to receive material from said first conveyor means and to discharge material received from the latter to a point of discharge, and driving means associated with said conveyor means to (1) effect simultaneous drive of both of the same to effect delivery of a stored load at a predetermined rate, (2) to effect continued operation of said delivery conveyor means to effect emptying thereof while a portion of said first conveyor means is stationary, and (3) to effect simultaneous operation of both conveyor means to effect the storing of a new load of material, the link connections between certain of said pusher elements being hinged, and means for locking rigidly or permitting collapse of said hinged links being provided whereby said driving means is operative to drive the whole or but a part of said first conveyor means at will.

9. In an apparatus of the character described, a hopper structure for receiving and storing material and having conveying means for moving material arranged in the bottom thereof for moving material from one end thereof to the other, said conveying means including a plurality of reciprocating material-moving elements, disposed throughout the length of said hopper structure, and means for actuating one portion of said material-moving elements while another portion thereof remains idle or for actuating all of said material-moving elements simultaneously, said actuating means including a cross shaft, links connecting said shaft with said elements for reciprocating the latter, said links including links between and pivotally connected to each pair of mutually adjacent material moving elements, and means for actuating said shaft to cause said links to reciprocate said elements.

10. In an apparatus of the character described, a hopper structure for receiving and storing material and having conveying means for moving material arranged in the bottom thereof for moving material from one end thereof to the other, said conveying means including a plurality of reciprocating material-moving elements disposed throughout the length of the hopper structure, and means for actuating one portion of said material moving elements while another portion thereof remains idle or for actuating all of said material-moving elements simultaneously, said actuating means including an oscillating cross shaft, hydraulic means for effecting oscillation thereof, and links, including links between and pivotally connected to each pair of mutually adjacent material moving elements, connecting said shaft with said elements for reciprocating the latter.

11. In an apparatus of the character described, a hopper structure for receiving and storing material and having conveying means for moving material arranged in the bottom thereof for moving material from one end thereof to the other, said conveying means including a plurality of reciprocating material-moving elements disposed throughout the length of said hopper structure, and means for actuating one portion of said material-moving elements while another portion thereof remains idle or for actuating all of said material-moving elements simultaneously, said actuating means including a crank pin-carrying cross shaft having a pin at each end thereof, rods connecting said crank pins and one of said material-moving elements, and links between and pivotally connected to each pair of mutually adjacent material-moving elements.

12. In an apparatus of the character described, a hopper structure for receiving and storing material and having conveying means for moving material arranged in the bottom thereof for moving material from one end thereof to the other, said conveying means including a plurality of reciprocating material-moving elements disposed throughout the length of said hopper structure, and means for actuating one portion of said material moving elements while another portion thereof remains idle or for actuating all of said material-moving elements simultaneously, said actuating means including a crank pin-carrying cross shaft having a pin at each end thereof, pitmen connecting said crank pins and one of said material-moving elements, and links between and pivotally connected to each pair of mutually adjacent material-moving elements.

13. In an apparatus of the character described, a hopper structure for receiving and storing material and having conveying means for moving material arranged in the bottom thereof for moving material from one end thereof to the other, said conveying means including a plurality of reciprocating material-moving elements disposed throughout the length of said hopper structure, and means for actuating one portion of said material-moving elements while another portion thereof remains idle or for actuating all of said material-moving elements simultaneously, said actuating means including a crank pin-carrying cross shaft having a pin at each end thereof, means for rotating said cross shaft unidirectionally, pitmen connecting said crank pins and one of said material-moving elements, and links between and pivotally connected to each pair of mutually adjacent material-moving elements.

ARTHUR LEE BARRETT.
JAMES S. BEENEY.

References Cited in the file of this patent

UNITED STATES PATENTS

| Number | Name | Date |
|---|---|---|
| 1,341,239 | Mason | May 25, 1920 |
| 1,428,290 | Kevlin | Sept. 5, 1922 |
| 1,548,065 | Schwendner | Aug. 4, 1925 |
| 1,552,968 | Trotter | Sept. 8, 1925 |
| 1,760,369 | Moe | May 27, 1930 |
| 2,107,682 | Wall | Feb. 8, 1938 |
| 2,169,390 | McCurdy | Aug. 15, 1939 |
| 2,174,097 | Sloane | Sept. 26, 1939 |
| 2,204,770 | Rankin | June 18, 1940 |
| 2,420,009 | Osgood | May 6, 1947 |
| 2,559,541 | Martin | July 3, 1951 |

FOREIGN PATENTS

| Number | Country | Date |
|---|---|---|
| 252,946 | Germany | Oct. 28, 1912 |